United States Patent [19]

Allen et al.

[11] 3,974,887

[45] Aug. 17, 1976

[54] COMPUTING WEIGHING SCALE WITH OPTIONAL SALE BY UNIT LABEL PRINTING WITH NO GOODS ON THE WEIGHING PLATFORM AS PRECONDITION

[75] Inventors: Kenneth C. Allen; Robert M. Rogers, both of Dayton, Ohio

[73] Assignee: Hobart Corporation, Troy, Ohio

[22] Filed: Apr. 14, 1975

[21] Appl. No.: 568,033

[52] U.S. Cl. ............................... 177/4; 177/DIG. 1; 235/151.33
[51] Int. Cl.² .................. G01G 23/38; G06F 15/20
[58] Field of Search .................. 177/DIG. 1, 2, 3, 4, 177/7; 235/58 PS, 61 PS, 151.33

[56] References Cited
UNITED STATES PATENTS 3,584,204   6/1971   Susor ................................. 177/3 X 3,851,720   12/1974   Williams, Jr. ........................... 177/3

*Primary Examiner*—George H. Miller, Jr.
*Attorney, Agent, or Firm*—Biebel, French & Nauman

[57] ABSTRACT

An apparatus allowing the ticket printer of a computing scale to be used for printing normal weight, value and price per unit weight labels or alternately for printing labels indicating a manually entered selling price. The selling price label can be used in sale by unit or sale by count merchandise pricing. Dual use of the normal scale printer for preparing either type of label reduces the equipment needed at a pricing station in addition to lowering the investment required for machine printed merchandise pricing. Automatic changeover from the weighed value to the sale by unit mode of operation in response to scale weight indication is also disclosed.

6 Claims, 4 Drawing Figures

U.S. Patent   Aug. 17, 1976   3,974,887
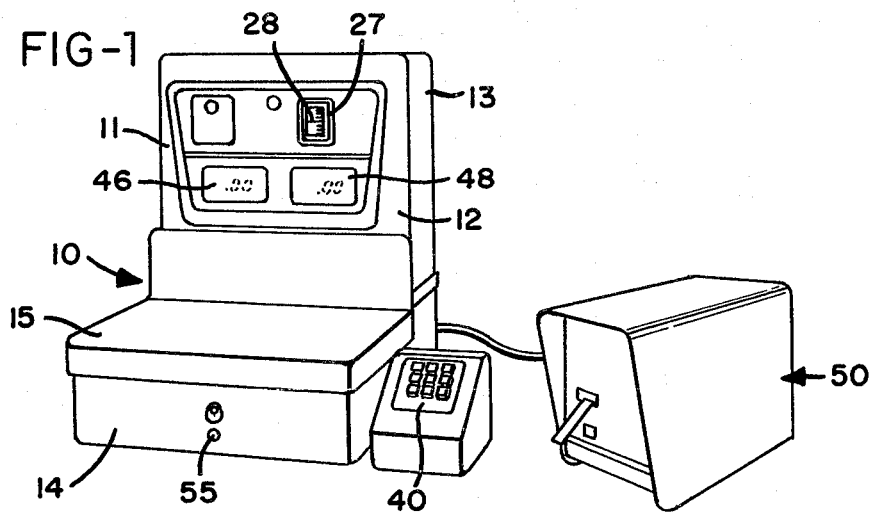
FIG-1
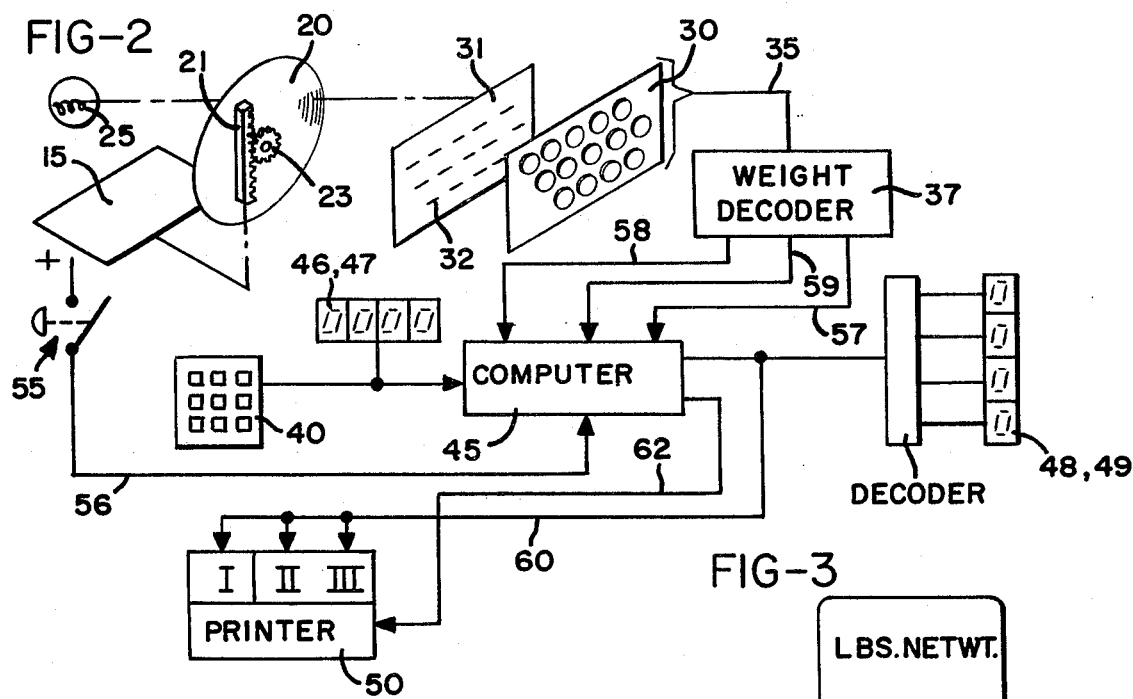
FIG-2
FIG-3
LBS. NET WT.
0.00
TOTAL PRICE
$ 1.40
PRICE PER
1 LB.
0.00
FIG-4
COPY
| WEIGHT LBS.NET | VALUE | PRICE LB. |
|---|---|---|
| 0.00 | $ 1.40 | 0.00 |
APPLES

COMPUTING WEIGHING SCALE WITH OPTIONAL SALE BY UNIT LABEL PRINTING WITH NO GOODS ON THE WEIGHING PLATFORM AS PRECONDITION

BACKGROUND OF THE INVENTION

This invention relates to recording weighing scales of the type which are intended to weigh successive items, such as grocery items, provide a visible output on the scale of the weight of the item and the price per unit weight for that item and once the scale mechanism comes to balance with the load, to provide a total value indication together with a printed ticket or label which includes the total value, the price per unit weight, and the weight of the item. Such recording scales are per se well known, a typical one being disclosed in U.S. Pat. No. 3,557,353.

In that scale, a set of manually rotatable control knobs provides the input for a price per unit weight factor. Where recording scales are used in certain grocery or delicatessen operations requiring frequent changes in the price per unit weight entry, it is sometimes more convenient to utilize a keyboard input device for entering the price per unit weight factor, and such an arrangement is shown in U.S. Pat. No. 3,741,324. The scale shown in that patent can readily be utilized in conjunction with a printer mechanism to provide a printed ticket on which is recorded the weight, price per unit weight, and value, in much the same fashion as the typical ticket disclosed in U.S. Pat. No. 3,557,353. It should be noted, however, that not all ticket printers print these three records simultaneously, and in fact it is quite common in connection with the type of scale shown in U.S. Pat. No. 3,741,324, to utilize a printer which prints a narrower ticket with the weight, value, and price per weight, printed in sequence on the ticket by a single array of type in the printer.

In certain grocery operations, items are sold by the unit, i.e., by the bag or by count or by the piece, and often such scales may be made from the same place where weighed and computed items are sold. It is therefore, desirable to outfit the recording scale in such an operation with a means for producing a record, such as a ticket or label on which only the selling price of the particular item is printed, and to do this in such a way that the operator experiences little change in the normal routine followed when the weighing and computing function is utilized.

SUMMARY OF THE INVENTION

In accordance with this invention the recording scale is provided with a signal output indicating the no load, or below minimumload, condition of the weighing device. This signal is readily derived from existing weight readout charts and devices utilized in conjunction with recording scales. The operation of the printer is initiated manually, as by closing a print switch, and this produces a start signal which causes the printer in the normal weighing and computing mode of operation to function through its printing cycle, utilizing information from the scale and the manually operated input device which provides the price per weight information. In recording scales without the feature of the present invention it is common to inhibit the printer when the scale is in the no load condition.

An essential feature of this invention is that the printer will function even though an output from the scale indicates no weight (or weight below a predetermined minimum), on the scale platter. Under these conditions in the present invention the printer will print out as value a manual pricing entry made when there is no load on the scale.

The operator thus can enter the desired selling price for an item in which weight is not considered, this price is retained in the computer, and by pressing the print switch, the operator automatically causes the printer to produce a ticket which is printed only in the value column i.e., the ticket displays in the value location a selling price and omits any printed record in the weight and price per unit weight locations on the ticket. Thus, in the present invention the same label stock can be used in both the normal weighing and computing mode of operation and the new value only mode of operation. Where the normal weighing and computing function is used, all the necessary information is printed on the ticket to comply with governmental weights and measures regulations, and where only a selling price is needed and no weight factor is involved, only such price is printed on the ticket.

In the value only mode of operation where only the selling price is printed, the entry from the keyboard is transferred into the value memory register of the printers for printing, but information in the registers for weight and price per unit weight is inhibited from printing. The resultant ticket is thus printed with only a selling price entry. In the case of sequentially operating printers, the print mechanism is simply inhibited at the times and ticket locations for printing weight and price per unit weight, thus the printed ticket bears only the printout of selling price.

The principal object of the invention, therefore, is to provide a recording scale which automatically converts the use of its manual price entry device and its printer to a means for printing a sales label or ticket for items in which the weight is not a consideration; to provide such a system wherein the operator may readily use the recording scale in either the normal or this new operating mode, without appreciably changing his routine of operation, and particularly without the need to select any special keys or switches for enabling the sale by unit printing operation.

Other objects and advantages of the invention will be apparent from the following description, the accompanying drawings and the appended claims.

BRIEF DESCRIPTION OF THE DRAWINGS

FIG. 1 is a pictorial diagram of the recording scale;
FIG. 2 is a block diagram of the system; and
FIGS. 3 and 4 are drawings of typical labels.

DESCRIPTION OF THE PREFERRED EMBODIMENTS

Referring to the drawings, and particularly to FIG. 1, a weighing scale 10 includes a housing 11 having a front wall 12 and a back wall 13. The scale also includes a base section 4 which supports the housing and on which is mounted a scale platform 15 adapted to receive goods thereon for weighing.

An optical chart 20 (FIG. 2) is mounted within the housing 11 and is connected by mechanical means to the scale platform 15. The scale includes springs (not shown) which permit the platform 15 to move through a distance proportional to the weight of the goods. The scale platform 15 is connected to a rack 21 having teeth which cooperate with a pinion 23 to rotate the optical chart 20.

The optical chart 20 may include in different tracks both human and machine readable indicia representing the weight on the scale platform. The human readable indicia includes numerals and lines which indicate fractions of the unit of weight, e.g., pounds. The machine readable indicia may include fourteen tracks in a typical embodiment. The chart 20 is illuminated by a lamp 25, and, when the human readable indicia is used, the image of the indicia on the chart is focused by a lens into three separate optical paths. One such optical path directs the image from a track onto a ground glass plate 27 (FIG. 1) mounted inside the front wall 12 of the vertical housing. This plate includes a reference mark 28 against which the human readable indicia may be referred. A second optical path directs the mirror's image from another track onto a second ground glass plate (not shown) mounted on the back wall 13. This provides the customer with the same human readable information representing the weight of the goods. Details of these optical arrangements are disclosed in U.S. Pat. No. 3,741,324. It is possible to provide the same information using electronic readout devices such as numerical display tubes or the like, in which case the optical weight readout is not used.

A third optical path directs the image from a track on chart 20 onto a plurality of photodetectors 30 where the machine recognizable indicia is converted into an electrical representation of weight. The photodetectors preferably are photoresistive devices, and in order to provide the necessary optical resolution, these photodetectors are exposed to the image of the track through a plate 31 which includes a plurality of slits 32 cut therein which are positioned over the photodetectors, as shown diagrammatically in FIG. 2. The photodetectors 30 therefore convert this optical information into electronic signals which are then carried by a cable 35 to a weight decoder 37. Weight decoder 37 provides weight indicative signals on line 59, signals indicative of the optical chart 20 registering a value below 0.02 pounds on line 57 and signals indicating movement of the optical chart 20 on line 58.

Price per unit weight information is provided through a keyboard unit 40. In the preferred embodiment, this is a conventional keyboard by which price per unit weight information may be entered serially and assembled into a word for transmission into a computer 45 where it is then multiplied by the weight information to provide total price or value of the item.

Price per unit weight information is displayed visually by two sets of electronic display tubes 46 and 47, each including four tubes. The total price or value or selling price information is displayed on two sets of tubes 48 and 49 which have their inputs connected to the computer 45. The displays 46 and 49 are mounted in the front wall 12 of the housing and are visible to the operator, while the displays 47 and 49 are mounted in the back wall 13 of the housing, and are visible to the customer. Certain combinations of the photodetectors 30 provide an output which indicates no load on the scale. In an actual embodiment, this signal may occur whenever the weight decoder indicates less than 0.02 pounds. A typical arrangement for deriving this no load signal is described in said U.S. Pat. No. 3,557,353, beginning at column 8, line 52. In some forms of recording scales, this no load signal is utilized to inhibit the computer whenever there is no weight on the scale platform.

The scale system of U.S. Pat. No. 3,741,324 provides a convenient starting point for an embodiment of the present invention. Although the scale shown in this patent does not include a label printer, a sequential printer which is capable of printing labels of the type shown in FIG. 3 of the drawings may be added thereto with the incorporation of certain additional elements including three storage registers I, II and III for the printer, as shown in FIG. 2. These added registers may be located in the printer housing in FIG. 1 or they may alternately be located in the computer 45 or in a location intermediate the computer and printer.

In accordance with the present invention, there is provided within the computer 45, a latch or memory device called the price print mode latch which is used to control whether the scale system operates in the weighing and computing mode (herein called the normal mode) or in the new "value only" mode.

This price print mode latch is placed in the set condition to cause value only mode of operation by a series of pulses appearing on line 57 and generated while the scale optical chart 20 is below the 0.02 pound weight value. The price print mode latch is reset by a reset signal indicating the scale optical chart has departed the 0.02 "near zero" band.

In the normal mode of scale operation, closure of print switch 55 causes information from the computer 45 to be transferred to the printer registers I, II and III (FIG. 2). This transfer is accomplished during a series of three computation cycles wherein each of the three signals, i.e., weight, price per unit weight, and total value are made available sequentially over the total value display lines through the use of unit pounds and unit price multipliers in the multiplication circuit. Thus the cable connection to the printer incorporates the lines necessary to convey total value, but these lines "set up" the printing unit three times during printing of a label, such as the one shown in FIG. 3.

As a part of this operation, following each multiplication by one, each of registers I, II and III is connected in turn with the total value display lines for information transfer as indicated at 60 in FIG. 2. The act of closing switch 55 in either operating mode sets a latch or flip-flop in computer 45; once this latch has been set, information transfer to registers I, II and III and subsequent printing of the stored information follows in a predetermined cycle of events.

In the value only mode, with no weight on the scale, price entered by way of keyboard 40 is transferred in the foregoing manner into register II, and the outputs from registers I and III are inhibited. Therefore the following printing operation initiated as before by closing print switch 55, will result in a label such as shown in FIG. 3 with zeroes (or no entry) in the weight and price per pound locations.

It should be noted that in the normal mode of scale operation, price information entered from the keyboard 40 is stored in a register located in the keyboard unit and is presented to the operator and customer via displays 46, 47. When this information is multiplied with the weight information, the resulting product is stored in the computer 45 and presented to the operator and customer via display 48, 49. To avoid customer confusion it is desirable to use the same display 48, 49 operated from register II for total value in the normal operating mode and for display of selling price in the value only mode. With the three-step printing cycle, this will also locate the price correctly on the label (see FIG. 3).

To allow use of register Ii for storing keyboarded selling price information in the value only mode with a minimum of special mechanization, it is convenient to continue use of a multiplication act for converting keyboard information into total value information. Such use of multiplication follows the normal practice in the scale computer and thus allows the handling and transfer of selling price information in the value only mode to be accomplished in the same transfer time slot and with the same circuitry used for total value information in the normal mode of operation. In the value only mode of operation, however, this multiplication act is performed by making a new use of forced multiplication by 1.00 pounds. This multiplication allows price per pound and total price to have the same numerical value in the value only mode. Change of the multiplicand from a weight value to the forced 1.00 value is accomplished in response to setting the price print mode latch.

In the interest of preventing customer confusion, it is also desirable that selling price information entered into the computer 45 during value only mode operation be removed from storage automatically following printing of labels; it being desirable that this information not be erroneously employed in computing a total value for the next item placed on the scale platter. To accomplish this reset it has been found desirable to provide a reset of the price per pound storage register in the keyboard 40 whenever the scale chart passes through the 0.02 pounds weight value.

The transfer of information from register I, II and III to printer 50 is accomplished by way of register synchronizing signals transmitted along path 62.

It is to be understood that even though the system of the preferred embodiment presents the keyboard entry selling price information at the value displays 48, 49 and similarly prints the selling price in the center of the printed label where total value is normally located, it is possible to achieve a simplified embodiment of the invention by displaying and printing selling price information in the location normally employed for keyboard entered information, e.g., price per pound. By suitably modifying the identity given keyboard information at the display 46, 47 and on the preprinted label stock in FIG. 3 for example, the value only mode of operation can be embodied without forced unit value multiplication for transfer into the total value location as was described above. This simpler embodiment of value only operation would, however, require removal of the safeguard interlocks which normally prevent computation and information display when the scale is below 0.02 pounds.

By way of summarizing operation of the system, print switch 55, which may be conveniently mounted in the base 14 of the scale, is depressed by the operator when it is desired to record information on the ticket or label to be issued from the printer. A typical label printing and dispensing apparatus may be such as disclosed in U.S. Pat. Nos. 3,556,898 issued Jan. 18, 1971, and U.S. Pat. No. 3,447,992, issued June 3, 1969.

When the print switch 55 is closed, this transmits a print command to the computer 45 on the line 56. If there is a weight output from the decoder 37, such that the price print mode latch in the computer is in the reset condition, the printer will print a ticket using information stored in each of the three registers, I, II and III. If the printer is of the type which prints the information in sequence, it will for example print on the label first the price per unit weight from register I, then the total value from register II, and finally the weight from register III. This sequence is apparent from FIG. 3, which shows a typical label issued from such a printer, the printing sequence being from bottom to top and viewed in FIG. 3. If the printer is of a type which prints all of this information simultaneously, issuing a ticket such as shown in FIG. 4, then all three printouts will occur simultaneously.

In the event that the print switch 55 is closed while there is a no load signal from the decoder 37, and the price print mode latch is set, signals along path 62 inhibit the printing of information from registers I and II and the printer is caused to operate only from the value register II, and either the other parts of the label are printed with zeroes, or they are not printed at all. For example, in the three-step sequencing printer, the first print-out of price per unit weight will have its output in register I inhibited, and either it will print zeroes, or the hammer unit of the printer will be inhibited so that no actual printing occurs. In the second printing step the amount stored in register II will be printed out, and this will be the pricing information received as a result of entry into the computer through keyboard 40. Finally, the output of register III to the printer will be inhibited with results the same as in the case of register I.

It will be seen, therefore, that in accordance with the invention, if a price is entered in the computer through the keyboard and, no weight is on the scale platform, and the print switch is closed, then the price factor which has been entered will be printed on the label as selling price. However, if there is an item on the scale it will be weighed, its weight will be multiplied by the price per unit weight factor entered into the computer, and there will be a printout of the price per unit weight, total value and weight. Should the operator accidentally close the print switch 55, without first entering a value in keyboard 40, a blank ticket will be printed. In the event the operator places an item on the scale platform and quickly presses the print switch, movement of chart 31 immediately removes the "below 0.02 pounds" no load signal, and places the price print mode latch in the normal weight mode position. The computer will not operate, however, until the motion detector (described in U.S. Pat. No. 3,557,353, beginning at column 12, line 36) indicates the scale has come to balance.

While the form of apparatus herein described constitutes a preferred embodiment of this invention, it is to be understood that the invention is not limited to this precise form of apparatus, and that changes may be made therein without departing from the scope of the invention.

What is claimed is:

1. In a computing scale including a weighing device, a computer having means for accepting price per unit weight and a weight input from said weighing device, said computer being operable to multiply weight and price per unit weight information and to produce a value output, a printer connected to said computer and controlled thereby to produce a printed record of at least the value, and a manual control for actuating said printer;

the improvement comprising means providing an output signal from said scale indicating no load on said scale, and a value only control responsive to the coexistence of a no load signal and operation of said manual control and connected to said printer to cause said printer to produce as a value record an amount entered as price per unit weight.

2. A weighing and ticketing system comprising a scale platform adapted to receive goods for weighing, means providing electrical signal representing the weight of the goods placed on said platform, means providing electrical signals representing the price per unit weight of such goods including manually initiated means by which an operator can cause entry of this information, means providing a signal indicating no goods are on said platform, computer means responsive to said weight signals and said price per unit weight signals and operative to compute the total value of such goods and to represent such value in the form of further electrical signals, a label printer receiving all of said signals and operative to print a label bearing the weight of the goods, the price per unit weight, and the value of the goods, print command means for signaling said printer to print a label, and a value only control responsive to a signal representing no goods on said platform and to signals from said manually initiated means and from said print command means, said control being connected to cause said printer to print a label bearing a value equal to the number represented by the signals from said manually initiated means.

3. In a computing scale system including weighing means for generating an electrical weight signal, manual means for generating an electrical price per unit weight signal, computing means for multiplying said weight and price per unit weight signals to obtain a total value signal, and means for printing the magnitude of said weight, price per unit weight, and total value signals in first, second and third predetermined positions on a label;

the improvement comprising:

means for generating a control signal indicating acutation of said manual means with no load on said weighing means, means actuated by said control signal for substituting an electrical signal representing a unit of weight for said electrical signal in said computing means to provide a value price signal identical with a price per unit weight signal generaated by said manual means;

means for transferring said value signal from said computing means to said printing means;

means responsive to said control signal for inhibiting the printing of all but said value signal on said label.

4. The scale system of claim 3 wherein said means for transferring also includes means for substituting an electrical signal representing a unit of weight for said electrical weight signal in said computing means.

5. In a computing scale system which includes input means for generating an electrical price per unit weight signal, means for generating an electrical weight signal indicative of article weight, means for generating an electrical total value signal indicative of the product of said price per unit weight and weight signals, means for displaying said price per unit weight, weight and total value signals, means for printing numbers indicative of said weight, price per unit weight and total value signals in predetermined different positions on a label, and inhibiting means preventing display and printing of at least price per unit weight information when the scale is near a zero weight condition;

the improvement comprising:

mode selecting circuit means responsive to weight on the scale being near zero and enabling operation of said scale system in an alternate mode by disabling said inhibiting of the display and printing of price per unit weight and by causing signals received from said input means to be displayed and printed with the scale in said zero weight condition, and means identifying information displayed and printed in said alternate mode operation as total value.

6. The apparatus of claim 5 further including means responsive to said mode selecting circuit means for transferring information received from said input means to said means for displaying total value signal, and means for printing information received from said input means in the predetermined label location normally used for total value information.

* * * * *